Jan. 12, 1965   M. G. STEELE   3,165,617
APPARATUS FOR JOINING METAL WIRES BY BRAZING
Filed July 23, 1962
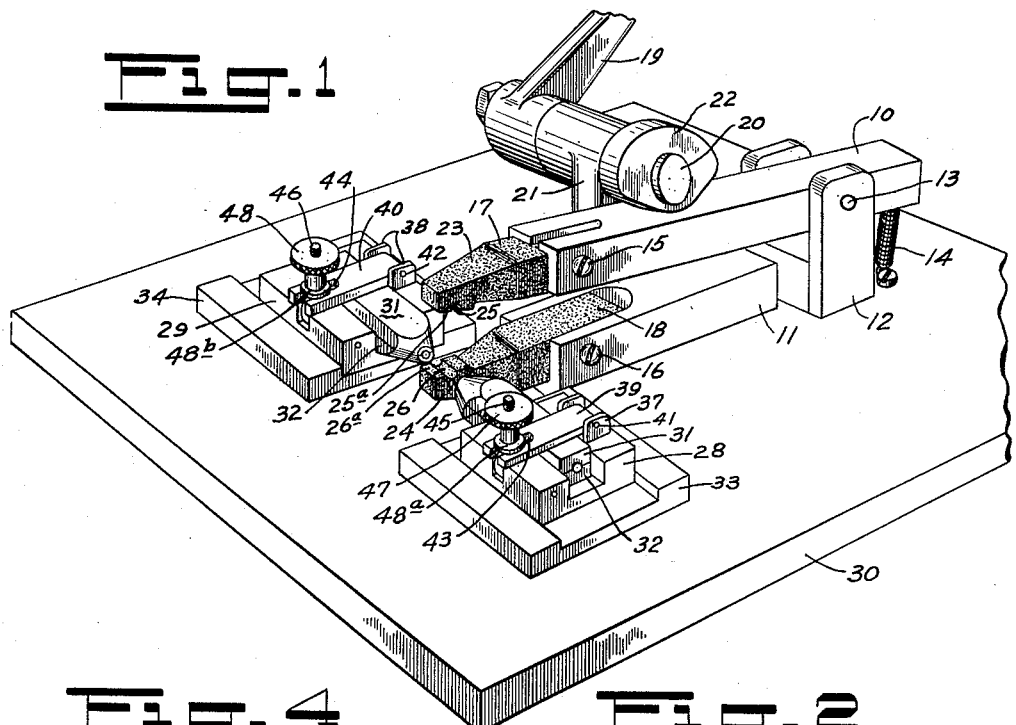
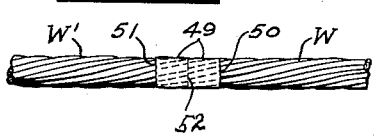
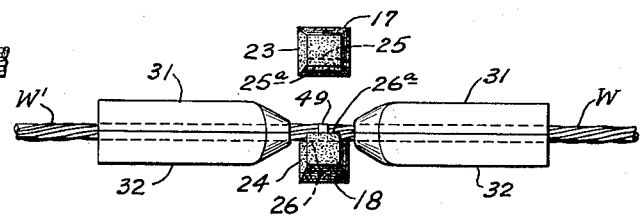
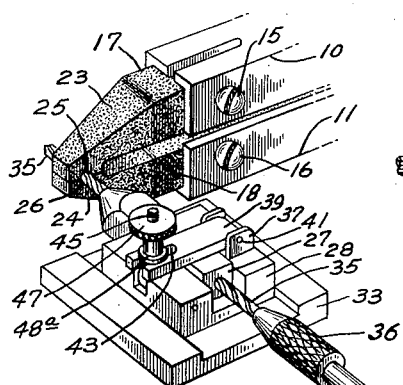
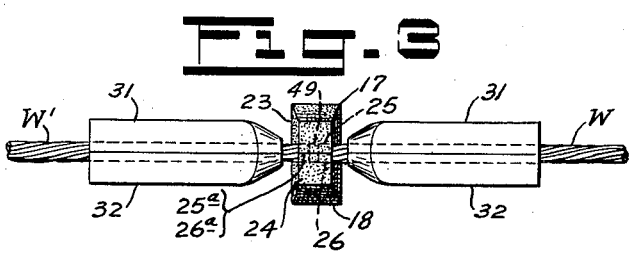
INVENTOR.
MAURICE G. STEELE
BY
H. G. Manning
ATTORNEY

United States Patent Office 3,165,617
Patented Jan. 12, 1965

3,165,617
APPARATUS FOR JOINING METAL WIRES
BY BRAZING
Maurice G. Steele, % M. G. Steele Co.,
508 W. Liberty St., Rome, N.Y.
Filed July 23, 1962, Ser. No. 211,522
3 Claims. (Cl. 219—85)

This invention relates to electric brazing apparatus for joining a pair of wires in abutted end-to-end relation, and more particularly to an apparatus employing a pair of carbon block electrodes for fusing a pellet of brazing compound between the ends of said pair of wires for causing them to adhere to each other.

One object of this invention is to provide an apparatus of the above nature which will produce a strong joint between the pair of wires of a quality and precision not hitherto possible, making available for the first time precision positioning and accurate control of the wires in the brazing process.

A further object is to provide an apparatus of the above nature which will be simple in construction, inexpensive to manufacture, easy to install and manipulate, compact, ornamental in appearance, and very efficient and durable in use. With these and other objects in view, there has been illustrated on the accompanying drawing, one form in which the invention may conveniently be embodied in practice.

In the drawing:

FIG. 1 illustrates a perspective view of the entire electric brazing apparatus, including the pair of carbon electrodes, the two pairs of split wire clamping collets, the sliding collet holders, the collet holder guides, and the insulating base.

FIG. 2 is a front end view in elevation of the pair of carbon electrodes shown in open position, and the two pairs of assembled split wire collets shown clamped upon a pair of stranded wires to be brazed together with a brazing pellet in the groove of the lower electrode between the ends of said wires.

FIG. 3 is a view similar to FIG. 2 with the electrodes shown in closed brazing position.

FIG. 4 is a side view of a pair of wires connected by a brazed joint, showing the chill lines and interface at the point where the pellet of solder connects said wires together.

FIG. 5 is a fragmentary perspective view of the brazing apparatus showing a twist drill in operating position for producing the aligned semicylindrical grooves in the carbon electrodes.

The present invention is an improvement over the applicant's prior Patent No. 2,796,511, dated June 18, 1957, for "Method and Apparatus for Joining Wires by Brazing." In the apparatus disclosed in this patent, the brazed joint between the ends of the two wires was produced by the use of a pair of opposed aligned carbon electrodes which were provided with semicylindrical transverse registering grooves shaped to have a sliding fit about the wires to be brazed.

In the operation of this prior apparatus, a small pellet of solder, preferably containing silver and copper, was introduced into the groove of the lower stationary electrode. The ends of the wires to be brazed were then placed in this groove on either side of the solder pellet. The upper electrode was then lowered into contact with the stationary electrode encasing the wire, and vertical pressure was exerted upon the pellet and the wire ends located therebetween. Longitudinal pressure was then exerted upon the wire ends so as to cause them to press inwardly upon the pellet and indirectly against one another.

Electric current was then passed through the electrodes, causing them to become heated and in turn to heat the solder pellet and the wire ends. The molten solder from the pellet would then wet the wire ends and join them together by adhesion. When it was ascertained that the pellet had completely melted, the current would be shut off and the electrodes and the wires cooled for a short period, after which the upper electrode would be raised and the wire clamping collets and their holders were removed from the apparatus.

While the method of joining wires disclosed in my prior patent has been substantially adopted by the wire industry, especially for the smaller sizes of copper wire from #16 to #30 (American Wire Gauge), it has been found that the production of a brazed joint of larger wires was not easily performed, especially in the case of stranded wires. This was due to the fact that when such wires were heated, the solder tended to flow axially away from the joint interface, due to capillarity. It was necessary therefore for the operator of the brazing unit, to shut off the electric current at just the exact time, before too much of the molten solder had migrated away from the interface between the wires where it was needed to make a successful bond.

In my prior patent, the flow of solder away from the joint was limited by the wire clamps which acted as chills and held the wire ends in axial alignment with the transverse grooves previously formed in the electrodes. Because the strands of wire at the brazed joint were filled with solder, they were reinforced thereby. This feature coupled with the absence of any annealing beyond the points of clamping, resulted in a brazed joint which was nearly as strong as the original wire and had the minimum stiffened length due to the solder, which is very important in flexible stranded wires.

While the basic ideas disclosed by this prior patent are practical and reasonably effective, it has been found that the mechanical design was unduly complicated, and further, that the spring actuation of the sliding wire clamps was not positive or dependable.

Another difficulty with this prior patented brazing apparatus was that the grooves in the wire clamps were not interchangeable and were adapted for use only with a single diameter of wire. Also with the construction disclosed in my prior patent, it was difficult to form the semicylindrical transverse grooves in the two opposed electrodes so that they will be in exact axial alignment with the grooves in the wire clamps.

By means of the present invention, the following important advantages in wire brazing equipment have been achieved, which simplify the process of making the brazed joints and improve the quality thereof:

(1) Precise abutted alignment of the wire ends.

(2) Restricting the travel of heat outwardly along the brazed wires so that the operator can grasp the split collets and holders in his bare hands without gloves.

(3) Restricting the length of the annealed wire section at the joint.

(4) Minimum length of the stiffened section of the joint impregnated by the solder.

(5) Higher tensile strength of the brazed joint.

(6) Conformity of the braze to various shapes and diameters of wire.

(7) Improved method of forming the transverse semicylindrical grooves in the opposed carbon electrodes, by employing a drill jig, whereby said grooves will be in precise axial alignment with the wire ends, thus achieving perfect abutting alignment of the wires at the brazed joint.

(8) Employing separable and interchangeable split clamping collets for various sizes of wire, whereby the wire ends will be brought into precise axial alignment with the transverse grooves previously formed in the electrodes.

(9) Using two aligned flanged guide blocks in which the split wire clamping collets may be moved manually in guided alignment with one another.

Referring now to the drawing, in which like reference numerals denote corresponding parts throughout the several views, the numerals 10 and 11 indicate respectively a movable upper holder and a fixed lower holder for a pair of rectangular carbon block electrodes 17 and 18, of square cross section. The numeral 12 indicates a U-shaped support for the upper electrode holder 10 which is pivotally mounted in the upstanding arms of said support by a fulcrum pin 13. A coil spring 14 connects the rear end of the electrode holder 10 with an insulating base 30, and urges the upper electrode 17 into the raised open position as shown in FIG. 1 of the drawing.

The upper electrode holder 10 and the lower electrode holder 11 are supplied by cables, not shown, with low voltage, high amperage current from a step down transformer, not shown. The electrodes 17 and 18 have tapered square front ends 23, 24, as clearly shown in the drawing, and are retained in their holders 10 and 11 by means of horizontal screws 15, 16.

An operating handle 19 for depressing the upper movable electrode 17 into the brazing position against the lower electrode 18 is provided, as illustrated in FIG. 1 of the drawing, which handle 19 is rockable upon a shaft 20, mounted in an upstanding bracket 21. The shaft 20 has a cam 22 on its end which is located above the middle part of the electrode holder 10. This cam provides a means for exerting variable pressure of the upper electrode against the lower electrode at their contact surfaces 25a, 26a. The tapered tips 23, 24 of the electrodes 17, 18 have a pair of aligned, semicylindrical transverse grooves 25, 26 located in inwardly offset contact surfaces 25a, 26a, produced by a twist drill 35, held in a hand chuck 36 which slides in a unitary drill jig 27 of square construction, as shown in FIG. 5.

The jig 27 is clamped within a forward sliding U-shaped collet holder 28 mounted in a forward guide block 33 located on the base 30. The drill 35 should have a diameter two or three thousandths of an inch larger than the wire ends W and $W_1$ to be brazed, thus providing sufficient clearance to permit the wire ends to be easily fed into the grooves 25, 26. It will be understood that an electric or hand rotary drill may be used to form the grooves 25, 26 in the electrodes 17 and 18 if desired instead of the hand chuck 36.

The drill jig 27 should be of the same size and cross-section as a pair of slidable assembled split wire clamping collets 31, 32 which are herein shown as square in cross section, when assembled, but it will be understood that any other cross-sectional shape may be employed. The assembled collets 31, 32 and the drill jig 27 may be interchangeably held in the forward slidable U-shaped holder 28 mounted in the guide block 33 (FIG. 5).

The wire clamping collets 31, 32 are formed with longitudinal semicylindrical grooves of such size that they will grip and hold the wires W, $W_1$ accurately in concentric axial position when clamping pressure is exerted upon them, by a pair of flat levers 39, 40, which are pivoted in U-brackets 37, 38, mounted in the holders 28, 29 upon fulcrum pins 41, 42. The other ends of the levers 39, 40 are provided with slots 43, 44 for receiving vertical screws 45, 46 having their lower ends threadedly engaged in the sliding collet holders 28, 29 respectively. The screws 45, 46 have knurled circular hand nuts 47, 48 which are provided with intermediate flanges 48a, 48b to press said levers 39, 40 downwardly against the split collets 31, 32.

*Operation*

With the two carbon block electrodes 17 and 18 held in closed position, as shown in FIG. 5, the pair of aligned semicylindrical grooves 25, 26 will be formed therein by means of the twist drill 35 mounted in the square jig 27 described above. The jig 27 will then be removed, and the wire clamping collets 31, 32 placed within the holders 28, 29 which are slidable in the flanged guide blocks 33, 34 to as to be in axial alignment with one another. The blocks 33, 34 are rigidly fastened to the base 30 by means, not shown, and it will be seen that either pair of the sliding collet holders 28, 29 may be moved inwardly toward the electrodes 17, 18 so that the span of the exposed wire can be held to a minimum.

In order to produce a brazed joint between the two wires W, $W_1$, a pellet 49 of brazing solder will be placed in the groove 26 of the lower electrode 18, FIG. 2, and the upper electrode will then be lowered upon it, as clearly shown in FIG. 3 of the drawing. Current will then be applied and axial pressure exerted on the pellet by the wire ends W, $W_1$. Sufficient solder will be retained in the braze intersurface 52 to produce an effective bond.

The resulting brazed area is characterized by sharp lines 50, 51 (FIG. 4) where the annealing and solder migration have been stopped by the chilling effect of the split collets 31, 32, and a short stiff length between said lines 50, 51 will thus be produced. Moreover, due to the absorption of the heat by the clamping collets 31, 32 from the wires W, $W_1$ during the brazing operation, it is possible for the operator to work without the protection of gloves.

One advantage of the present invention is that it is now possible to make brazed joints in solid stranded wires of number 16 gauge and larger, of a quality not hitherto possible.

By means of the new and useful improvements in the art of brazing provided by the present invention, interchangeable split metal collets are provided which will tightly hold the ends of a pair of wires and accurately guide them in a lineal path so as to correctly index them with the grooves previously drilled in a pair of transversely located carbon electrodes.

While there has been disclosed in this specification one form in which the invention may be embodied, it is to be understood that this form is shown for the purpose of illustration only, and that the invention is not limited to the specific disclosures, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In an apparatus for joining a pair of wires by brazing, two radially clampable collets for gripping the respective end portions of said wires, said collets having elongated openings extending longitudinally thereof for receiving said wire end portions, collet holder means for clamping each collet, two fixed guide blocks for receiving said respective collet holder means so that said collets are restrained against sidewise movement and can only move longitudinally toward and away from one another, a pair of electrodes between said guide blocks, at least one of which electrodes is movable towards and away from the other, and a drill jig for guiding a twist drill of approximately the same diameter as that of the wires to be joined, which drill jig is adapted to be interchangeably received in said collet holder means for longitudinal movement along one of said guide blocks so that a cylindrical opening can be drilled in part in each of said electrodes and in accurately aligned relationship with the elongated openings in said collets.

2. An apparatus for joining a pair of wires as set forth in claim 1 wherein each of said collets is square in cross section and comprises separable jaw sections having registrable grooves in the adjacent faces thereof to define said elongated opening, all of said jaw sections being of the same rectangular cross sectional size and shape throughout the major portion of their length and having symmetrically tapered inner end portions for the efficient dissipation of heat in the wire being brazed.

3. An apparatus for joining a pair of wires as set forth in claim 2 wherein each of said collet holder means comprises a generally U-shaped lower portion slidably received in one of said guide blocks for longitudinal movement with respect thereto, said lower portion of said holder means defining a rectangular socket for interchangeably receiving one of said rectangular jaw sections and said drill jig, and an upper portion of said holder means for selectively clamping said collet and said drill jig to the lower portion thereof for movement longitudinally of said guide block, said holder lower portion serving to restrain said collet and said jig against sidewise movement with respect thereto.

References Cited by the Examiner

UNITED STATES PATENTS

| | | | |
|---|---|---|---|
| 2,298,633 | 10/42 | Winlock et al. | 219—119 X |
| 2,348,884 | 5/44 | Dewees | 219—85 |
| 2,397,052 | 3/46 | Schietinger | 219—85 |
| 2,796,511 | 6/57 | Steele | 219—85 |
| 3,110,793 | 11/63 | Worthington | 219—85 X |

RICHARD M. WOOD, *Primary Examiner.*